United States Patent
Hollett et al.

(10) Patent No.: US 6,202,173 B1
(45) Date of Patent: Mar. 13, 2001

(54) SOFTWARE FAULT LOCATION

(75) Inventors: Raymond Michael Hollett, Woodbridge; Colin Stirling Davidson, Dunfermline, both of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 08/343,452

(22) PCT Filed: May 28, 1993

(86) PCT No.: PCT/GB93/01119

§ 371 Date: Nov. 28, 1994

§ 102(e) Date: Nov. 28, 1994

(87) PCT Pub. No.: WO93/24882

PCT Pub. Date: Dec. 9, 1993

(30) Foreign Application Priority Data

May 29, 1992 (GB) .................................................. 9211368

(51) Int. Cl.[7] .................................................. H02H 3/05
(52) U.S. Cl. .................................................. 714/38; 714/25
(58) Field of Search ................... 395/183.14; 714/38, 714/39, 25, 45, 46; 712/227

(56) References Cited

U.S. PATENT DOCUMENTS

| | | | |
|---|---|---|---|
| 4,730,315 | * 3/1988 | Saito | 371/19 |
| 4,872,167 | * 10/1989 | Maezawa | 395/183.14 |
| 4,943,968 | * 7/1990 | Hirose | 371/19 |
| 4,956,773 | * 9/1990 | Saito | 364/200 |
| 5,210,859 | * 5/1993 | Aoshima | 395/575 |
| 5,287,449 | * 2/1994 | Kojima | 395/161 |
| 5,375,125 | * 12/1994 | Oshima | 371/19 |

FOREIGN PATENT DOCUMENTS

0439342 * 7/1991 (EP) .

OTHER PUBLICATIONS

Corsin: et al., Multibug: Interactive Debugging in Distributed Systems, IEEE Micro, vol. 6, No. 3, Jun. 1986, pp. 26–33.*

Bemmerl et al., Menu and Graphic Driven Human Interfaces for High Level Debuggers, Microprocessing and Microprogramming, vol. 24, Aug. 1988, pp. 153–159.*

Moser, GADD—A Tool for Graphical Animated Design and Debugging, IEEE Conf. on Communications, vol. 3, Jun. 10, 1987, pp. 1337–1341.*

* cited by examiner

Primary Examiner—Dieu-Minh T. Le
(74) Attorney, Agent, or Firm—Nixon & Vanderhye P.C.

(57) ABSTRACT

In an arrangement for locating faults in software, a history file is created during running of the software, which file contains values for variables in the software which can then be reviewed in the event of system failure. Review can be carried out in a forwards, backwards or search mode, in the manner of conventional video tape controls by a video type interface between a debugger and the history file created during running of the software.

10 Claims, 2 Drawing Sheets

SOFTWARE FAULT LOCATION

BACKGROUND OF THE INVENTION

1. Field of the Invention

The present invention relates to fault location in software.

2. Related Art

Fault location and analysis is an important aspect of writing software. It is extremely difficult to create a program or system of any complexity which has no faults or errors. These may not appear when the software is first run but at some later time when a particular set of circumstances arises and an expected result is not achieved. A program might crash or there might be total system failure.

SUMMARY OF THE INVENTION

Clearly, it is important to analyse what went wrong so that it can be corrected, and this analysis can be done in more than one way. For instance, fault checking can be done as a "post mortem" exercise, an operating system being designed automatically to copy memory onto disk when the software fails. The data stored at the time of failure then provides a "snap shot" of the prevailing circumstances from which an attempt can be made to find out what caused the failure. Alternatively, dedicated debugging software can be written into the main software such that when compiled after a system failure, and run under the debugging software, a faulty program or piece of software can be stopped, allowing a problem to be pinpointed perhaps at an earlier stage.

In use, there are disadvantages with each of these types of fault checking system. With the post mortem type, it is only possible to look at a snapshot of information at the time the system goes down. This may not be sufficient for fault analysis. In taking the alternative approach and using specially created debugging software, however, the extra software can make a major contribution to the size of a system overall. It is necessary for the debugger to know where the relevant variables are in memory. This type of debugger is therefore expensive in that the program incorporating it becomes much larger, and there is a big expense in memory in having to flag where the variables are located. Further, although the debugger is more flexible in that it is possible to re-run the program, it still can only be re-run in one direction. This is a significant limitation particularly in big systems since re-running whole programs can be unwieldy and time-consuming.

An object of the present invention is to provide a system or arrangement for fault location in software which is not particularly expensive in terms of memory or software complexity but which gives more information about events leading up to a system problem than simply data at the time of system failure.

According to the present invention, there is provided an arrangement for locating faults in software which comprises means for storing multiple values for each of one or more data variables during running of said software, and means for accessing the values stored thereby for review.

Preferably, said means for accessing is adapted to review the values stored in an order which can be selected from either a forward or a backward order with respect either to their storage locations or to their chronological occurrence.

Hence, an embodiment of the present invention may create a "history file" during running of software in which are stored the values relevant to each of a number of variables over a period of time, which values can then be reviewed, for instance on system failure, in a forward or backward chronological direction, in the manner of viewing a video-tape. Preferably, a search facility is also provided.

Embodiments of the present invention can be particularly useful in software which provides flow chart coding from a screen. This is a known technique by means of which a user creates an end program by selecting a combination of flow chart elements from a screen, configuring them to provide the end software function required. Known flow chart coding systems, that automatically generate code from graphical symbols selected and shown on the screen, provide program execution tracing information referencing the generated code. This is typically line number in a textual generated language code. The process of correlating the information to the graphical symbol level is then manual. Embodiments of the present invention can have a major advantage if the program execution tracing information is tied directly with the graphical symbols selected and shown on the screen.

A method for fault location in software according to an embodiment of the present invention might comprise the steps of 1. storing consecutive or sampled values for each of one or more variables during running of the software, in a memory or allocated portion of memory, and;
2. in the event of detection of a fault in the running of the software, displaying said values for review.

The values may be displayed sequentially, in a forwards or backwards direction with respect to their relative storage locations in said memory, or with respect to their chronological order of storage in said memory. In particularly advantageous embodiments of the present invention, the values are displayed on a screen simultaneously with a flow chart display which had been generated during a flow chart coding process in which the relevant fault occurred, the graphical symbol from the display which is relevant to each set of values being identifiable. For instance, said values may be displayed in a banner or footnote, together with the flow chart displaying the relevant symbol from the flow chart being highlighted.

Where the values are displayed sequentially, a predetermined interval can be set during which values for each selected box or graphical symbol are shown, followed by values for the next box or graphical symbol. This provides a form of "animation" of the values which makes the debugger particularly easy to use, and to learn to use.

BRIEF DESCRIPTION OF THE DRAWINGS

A method of flow chart coding incorporating an embodiment of the present invention will now be described, by way of example only, with reference to the accompanying figures, in which.

DETAILED DESCRIPTION OF EXEMPLARY EMBODIMENTS

Figure 1:
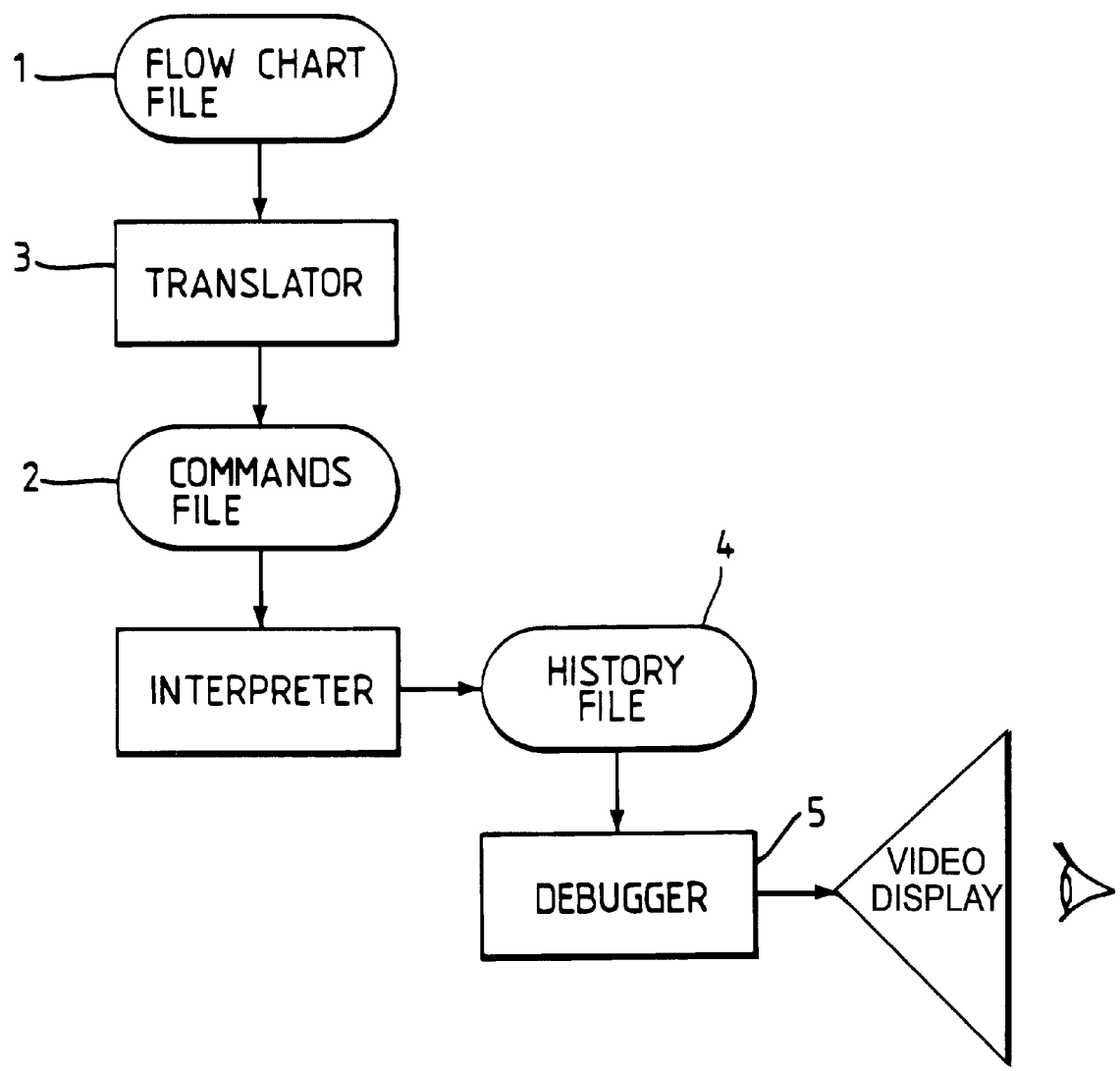
FIG. 1 shows in schematic form a series of functional steps in creating a history file from which a debugger facility can be provided.

Referring to FIG. 1, in a particular embodiment of flow chart coding software, two files might normally be used or generated in a flow chart coding exercise, these being a graphics file 1, representing the contents of the available on-screen flow chart boxes, and a commands file 2, the output of the exercise, ready for execution. These interface via a translator 3.

In accordance with the invention, however, a third file, a history file 4, is automatically created during running of software in a flow chart coding exercise. The history file 4 may be created simply by inserting print statements in the commands file 2 such that any changed value for a variable is automatically stored in the history file 4 on running of the commands file 2. This can simply be done by means of the translator 3. The history file 4 will then contain a series of values for each variable which indicate how that variable has changed in time.

In a flow chart coding embodiment as described, to aid fault analysis the values stored need to be related to the position of the relevant variable on the screen during the running of software in a flow chart coding exercise. This can be done by storing box and chart information with each value. Hence, the contents of the three files 1, 2, 4 might be of the following types:

Graphics file 1;
   15 box task 303, 3
   [let a=3]
   linked to 16
Commands file 2;
   let a=3
   print_to_history_file "chart 2 box 15 let "; a; "=3"
History file 4;
   chart 2 box 15 let 3=3

On system failure, a debugger 5 according to the present invention can simply step through the history file 4 in either direction, in the manner of viewing or searching a videotape, such that events leading up to system failure can be not only reviewed but searched in either chronological direction with respect to events. There is therefore provided a video style interface between the debugger 5 and the history file 4 created during running of the flow chart coding program.

Figure 2:
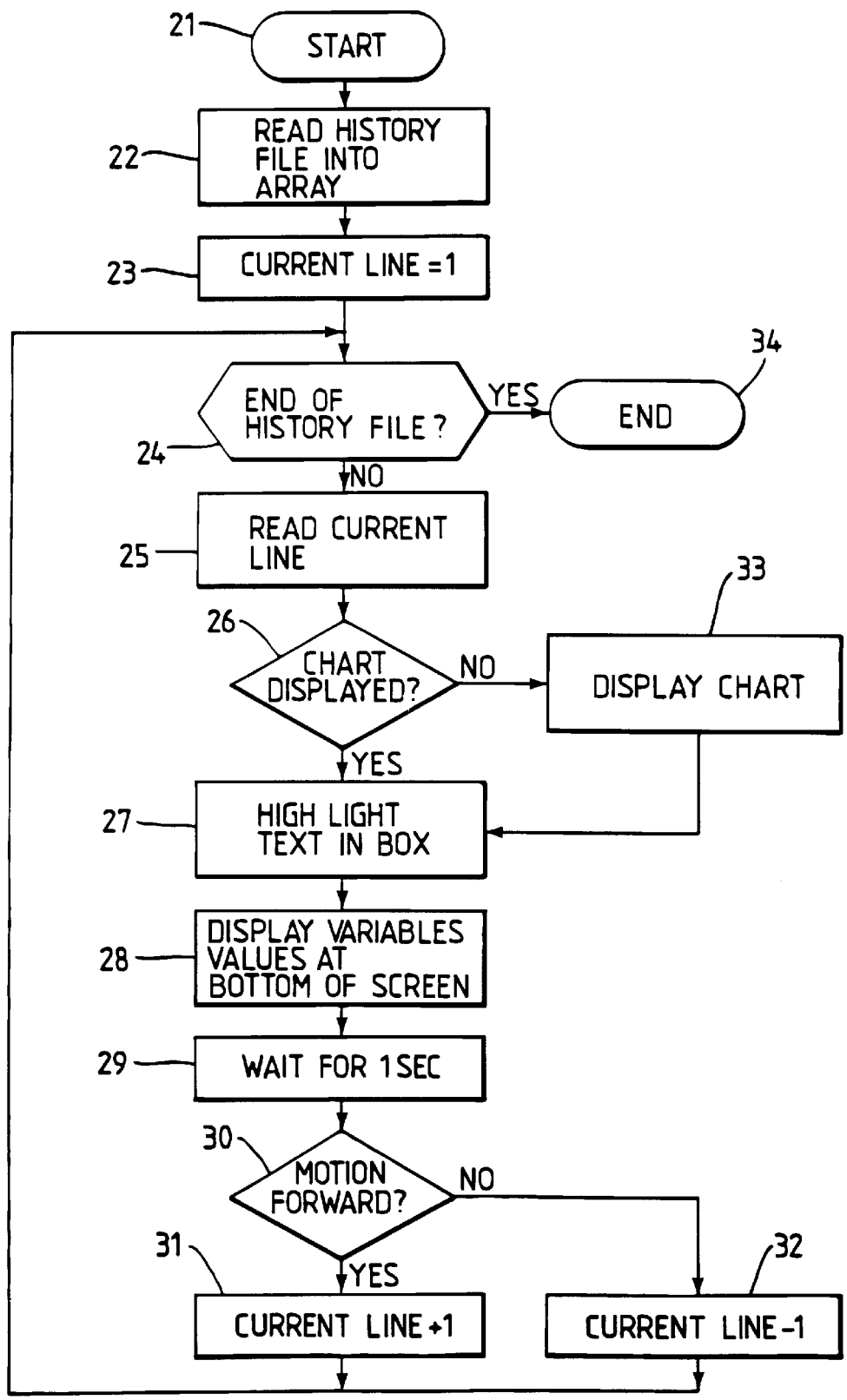
FIG. 2 shows a flow chart for controlling a review of values stored in a history file in a fault location exercise.

Referring to FIG. 2, logic for said video style interface operates as follows. The history file 4 is read into memory as a single dimensional array, or vector, in which the index is the line number in the array and the content of each element is a text string. The history file 4 can then be read in the manner of a video replay facility by setting a line number, reading the current line which provides box and chart information together with the relevant values of the variables, displaying variables from the current line, and then simply stepping through the lines sequentially.

In the flow chart shown in FIG. 2, the logic steps involved are as follows. At "START" 21, the history file 4 is automatically read into memory in a single dimensional array in a READ step 22, and the debugger brought to the first line of the array in a line-setting step 23. The logic then steps through the loop shown, starting with a position check 24 which is provided so that a review of the history file 4 will stop automatically at the end of the file, through READ, DISPLAY and associated steps 25 through 32, until the end of the history file 4 is reached.

Since in this embodiment the history file 4 contains values for variables associated with flow chart graphics, it is very valuable, even essential, to be able to relate the review process to both chart and box references. Hence, the text string contained in an element of the single dimensional array created from the history file 4 will incorporate chart and box information. For instance, the text string at line 15 in the array might read "25 let 3=3", the reference number for the line of code, "25", implicitly containing the information that the variable appears at chart 2, box 15, in the flow chart display used in the flow chart coding exercise. In the debugging routine shown in FIG. 2, the user who has initiated the debugging operation will actually see displayed the flow chart generated at the time the variable had the value shown at line 15 in the array. Further, the text relevant to the variable is highlighted in a highlighting step 27 and the actual values of the variables are displayed separately, at the bottom of the screen.

In the manner of a video-tape control, the debugger routine can run through the history file array in a forwards or backwards direction, at a fixed rate. This fixed rate is set by a WAIT step 29 in the loop. Review in the forwards or backwards direction is selected by providing a global variable "MOTION" which can be set to be forwards or backwards by the user. Thus, there is a direction decision step 30 in the loop which checks the desired review direction and increments or decrements the line number in the array accordingly.

A search facility can be provided, this not being shown in FIG. 2, simply by setting the "WAIT" period to zero and substituting for instance a box number for the "END" constraint in the loop.

Although as above described the debugging technique is associated with flow chart coding, the software with which the debugger is associated could be of a quite different type, the principle of using a history file and video type interface being clearly more widely applicable. However, the use of a debugger according to an embodiment of the present invention in the manner described, with software generating a graphics or textual display, is particularly user friendly in presenting both the relevant graphics or textual display and the values of the variables during review. Known debuggers operate simply at the source code level.

That is, a novel feature of the debugger is that program execution tracing is directly shown at the graphical symbol level. This speeds up debugging and cuts out the human correlation errors.

Other debuggers have either textual user interfaces or simple graphical interfaces. They are not easy to use for novices.

A novel feature of the debugger described above is that the user interface is based on the video recorder interface, which provides a simple metaphor. This makes the use by novices much easier.

Further, other debuggers let you manually step one or more steps forward or let you go forward at the full machine speed. With known "text browsers" one can manually move forwards and backwards in a textual trace file.

A novel feature of the debugger described above however is an automatic mode to trace the program execution path both forwards and backwards. This enables the user to set a time (e.g. 2 seconds) for the delay between moving from one symbol to the next or previous symbol on the screen during review. This "animation" can be stopped and restarted from the video type controls. This "animation" can be stopped and restarted from the video type controls. This makes using the debugger easier and helps with explaining the execution to others.

The "animation" feature referred to above can be provided simply by allowing the period set by the "WAIT" step 29 to be selected, instead of being preset.

What is claimed is:

1. An arrangement for locating faults in software created by flow chart coding on a video display which arrangement comprises:

means for storing multiple values for each of one or more data variables during running of said flow chart coded software, and means for accessing the values stored thereby for review on a display in the event of a fault occurrence in running said flow chart coded software, wherein said means for accessing is adapted to review the values stored in an order which can be selected from either a forward or a backward order with respect to their storage locations or chronological occurrence.

2. An arrangement for locating faults in software created by flow chart coding on a video display which arrangement comprises:

means for storing multiple values for each of one or more data variables during running of said flow chart coded software, and means for accessing the values stored thereby for review on a display in the event of a fault occurrence in running said flow chart coded software, wherein said means for accessing further provides a search facility means such that the value or values of one or more variables can be reviewed with respect to a selected point in running said software.

3. An arrangement for locating faults in software created by flow chart coding on a video display which arrangement comprises:

means for storing multiple values for each of one or more data variables during running of said flow chart coded software, and means for accessing the values stored thereby for review on a display in the event of a fault occurrence in running said flow chart coded software, wherein flow charts are displayed, each flow chart comprising a plurality of boxes, during a flow chart coding exercise, the arrangement further comprising:

means for storing a box identifier and a chart identifier in association with each of said variables such that values stored can be related, during review in the event of a fault occurring, to a relevant variable.

4. An arrangement as in claim 3 wherein the flow chart including a data variable is displayed during review of multiple values of said data variable, and said box and chart identifiers are used in identifying the relevant data variable in the flow chart.

5. A method of fault location in software created by flow chart coding on a video display, said method comprising the steps of:

1) storing multiple values for each of one or more variables, during running of the flow chart coded software, in a memory;

2) in the event of a fault occurrence in said running of the flow chart coded software, displaying said values for review; and 3) selectively controlling the display of said values for review in a forwards or a backwards direction with respect to their relative storage locations in said memory.

6. A method of fault location in software created by flow chart coding on a video display, said method comprising the steps of:

1) storing multiple values for each of one or more variables, during running of the flow chart coded software, in a memory;

2) in the event of a fault occurrence in said running of the flow chart coded software, displaying said values for review; and 3) selectively controlling the display of said values for review in a forwards or a backwards direction with respect to their chronological order of storage in said memory.

7. A method of fault location in software created by flow chart coding on a video display, said method comprising the steps of:

1) storing multiple values for each of one or more variables, during running of the flow chart coded software, in a memory;

2) in the event of a fault occurrence in said running of the flow chart coded software, displaying said values for review; and 3) selecting a point or event during the running of the software and searching said multiple values to select the value or values relevant to said point or event for display.

8. A method of fault location in software created by flow chart coding on a video display, said method comprising the steps of:

1) storing multiple values for each of one or more variables, during running of the flow chart coded software, in a memory;

2) in the event of a fault occurrence in said running of the flow chart coded software, displaying said values for review; and 3) storing box and chart identifiers in association with each of said one or more variables; and 4) displaying said values together with a relevant chart during the step of displaying said values for review.

9. An arrangement for locating faults in software created by flow chart coding on a video display which arrangement comprises:

means for storing multiple values for each of one or more data variables during running of said flow chart coded software, and means for accessing the values stored thereby for review on a display in the event of a fault occurrence in running said flow chart coded software, wherein said means for storing multiple values includes the presence of an output command to a history file for the value of at least one of said data variables interspersed with other commands for performing specified tasks in the flow chart coded software.

10. A method of fault location in software created by flow chart coding on a video display, said method comprising the steps of:

1) storing multiple values for each of one or more variables, during running of the flow chart coded software, in a memory;

2) in the event of a fault occurrence in said running of the flow chart coded software, displaying said values for review; and wherein said storing step includes providing an output command to a history file for the value of at least one of said data variables interspersed together with other commands for performing specified tasks in the flow chart coded software.

* * * * *